United States Patent

[11] 3,586,342

| [72] | Inventor | Thomas E. Staab<br>Justice, Ill. |
|---|---|---|
| [21] | Appl. No. | 774,154 |
| [22] | Filed | Nov. 7, 1968 |
| [45] | Patented | June 22, 1971 |
| [73] | Assignee | Dana Corporation<br>Toledo, Ohio |

[54] HYDRODYNAMIC SHAFT SEAL
9 Claims, 6 Drawing Figs.

[52] U.S. Cl. ............................................. 277/134
[51] Int. Cl. ............................................. F16j 15/32, F16j 15/02
[50] Field of Search ............................................. 277/134

[56] References Cited
UNITED STATES PATENTS
3,497,225  2/1970  Workman ..................... 277/134

2,958,551  1/1960  Rogers ........................ 277/134 X
FOREIGN PATENTS
1,468,256  2/1966  France ........................ 277/134
OTHER REFERENCES
"Zero Leakage" Paper No. 67-W/A Lub-11, by R. L. Dega, Jul. 18, 1967, page 12, 277– 134

*Primary Examiner*—Samuel Rothberg
*Attorneys*—Walter E. Pavlick, John F. Teigland, Harold D. Shall and Richardson B. Farley

ABSTRACT: Disclosed herein is a bidirectional hydrodynamic rotary shaft seal. The seal is of the radial lip type and has a plurality of hydrodynamic sealing elements adjacent the sealing lip. The sealing elements comprise triangular pads having a cylindrical concavity.

PATENTED JUN22 1971  3,586,342
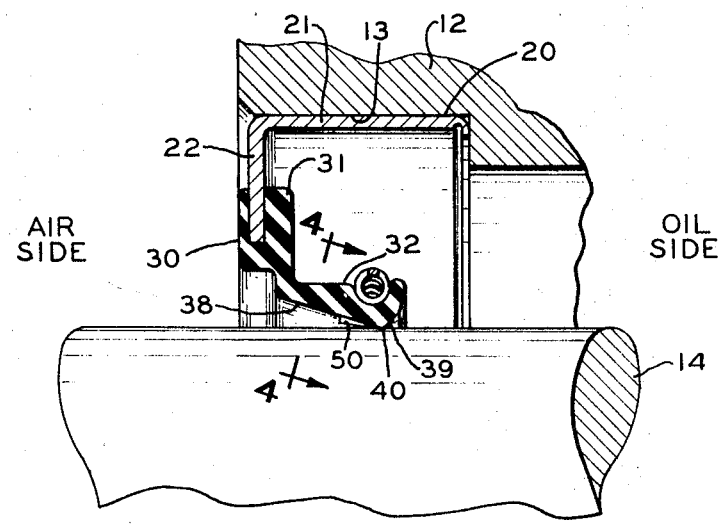
FIG. 1
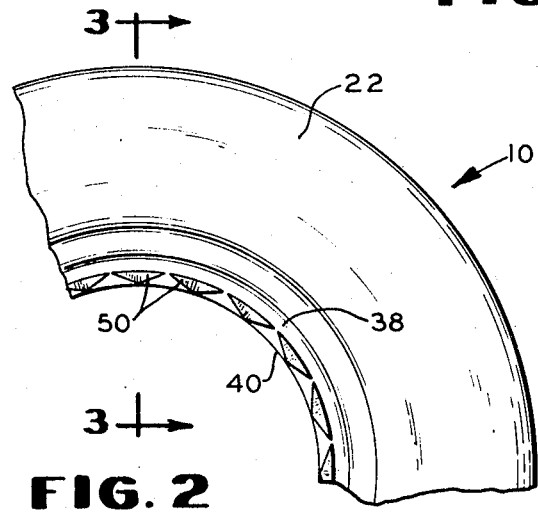
FIG. 2
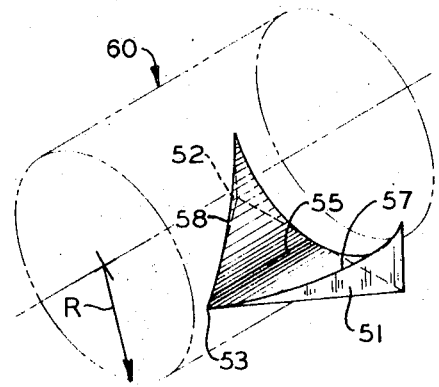
FIG. 5
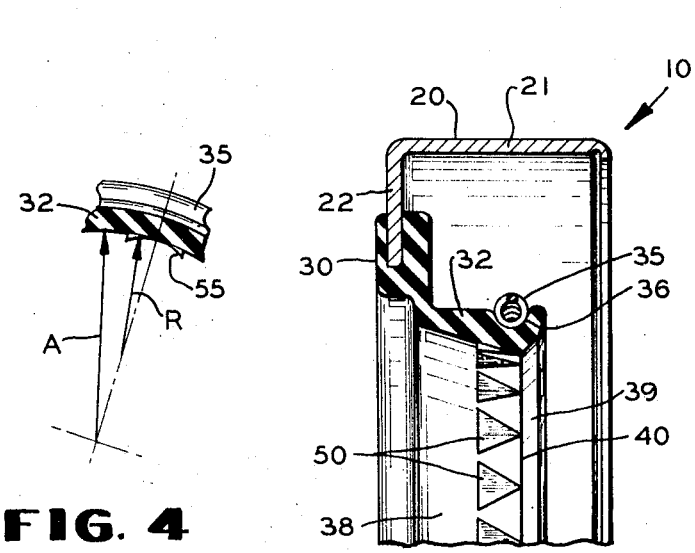
FIG. 4
FIG. 3
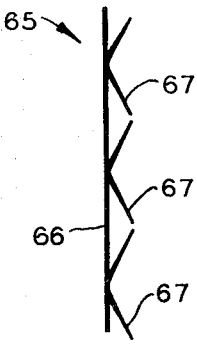
FIG. 6
INVENTOR.
THOMAS E. STAAB
BY John F. Weigland
ATTORNEY

HYDRODYNAMIC SHAFT SEAL

This invention relates generally to rotary shaft seals of the radial lip type and more particularly to a bidirectional, hydrodynamic rotary shaft seal.

The conventional radial lip-type shaft seal comprises an annular, rigid case to which there is bonded resilient annulus, generally formed of an elastomeric material. The inner diameter of the annulus is a circumferentially extending sealing lip which is defined by converging frustoconical surfaces and adapted to sealingly engage a rotating shaft. Under normal operating conditions the conventional lip seal provides an adequate seal under both static and dynamic conditions. Under these conditions, a thin film of oil exists between the sealing lip and the shaft and serves to lubricate the sealing lip. This thin film of oil remains under the lip and does not move out except when the oil film thickness exceeds a certain critical value. This critical value however can be exceeded under a number of conditions.

Imperfections on the shaft or the seal itself can cause an increase in the thickness of the oil film. Also, under certain temporary conditions of dynamic stress or disturbance the critical thickness of the oil film may be exceeded. Some of these conditions include temperature changes, shaft speed changes, oil viscosity changes, and eccentric or linear shaft vibration. The effect of these disturbances is to increase the oil film thickness under the lip which if in excess of a certain critical value will cause oil flow past the lip.

To improve the performance of the conventional rotary shaft seal of the lip type it has been proposed to give the lip seal a hydrodynamic assist by providing in conjunction with the lip or on the lip itself helically disposed ribs or grooves which together with the rotating shaft create a hydraulic pressure effect on the oil to force the oil back under the seal lip.

Some of the problems encountered in developing this type of lip seal are age-hardening of the elastomeric sealing lip because of the heat generated by the greatly increased contact area created by the helical ribs, reduction of effective unit pressure on the lip seal because of spreading the unit loading over a larger surface and loss of static sealing capability because of the helical ribs lifting the lip seal out of contact with the shaft.

The object of this invention is to provide an improved hydrodynamic rotary shaft seal of the lip type wherein the aforementioned disadvantages are eliminated or reduced to within acceptable limits.

The rotary shaft seal of this invention comprises a conventional rotary shaft seal having a sealing lip defined by converging frustoconical surfaces and a series of raised triangular pads or hydrodynamic sealing elements that have their apexes arranged toward the sealing lip and whose side legs provide deflection surfaces helically disposed towards the lip to create a hydro hydraulic pressure with the rotating shaft to force back oil bypassing the sealing lip. Each sealing element or pad is scalloped, i.e. made concave, to give it a concavity with a radius of curvature less than that of the frustoconical surface on which it is located. In the drawings:

FIG. 1 is a partial cross-sectional side view showing the rotary shaft seal of this invention in position between a housing and a rotatable shaft;

FIG. 2 is a partial plan view of the rotary shaft seal of this invention;

FIG. 3 is a partial cross-sectional view taken along the line 3—3 of FIG. 2;

FIG. 4 is a partial cross-sectional view taken along the line 4—4 of FIG. 1, showing the respective radii of curvature of the hydrodynamic element and frustoconical surface on which it is located;

FIG. 5 is an enlarged perspective view of the hydrodynamic sealing element of this invention; and FIG. 6 is a view of the contact pattern of the rotary shaft seal of this invention on a shaft. Referring to FIG. 1, the rotary shaft seal 10 of this invention is designed to provide a seal between a housing 12 and a relatively rotatable shaft 14 extending through the housing. The housing may be, for example, that of an internal combustion engine and the shaft may be a crankshaft. In the preferred embodiment, the seal 10 comprises a rigid, annular case 20 to which there is bonded a resilient annulus 30. The case 20, which may be stamped from a steel blank, has an axially extending annular portion 21 and integral therewith, a radially inwardly extending flange 22. The annular portion 21 is dimensioned to provide an interference fit with an annular bore 13 formed in the housing 12. The interference fit between the case 20 and the bore 13 is generally sufficient to maintain the two components in assembled relationship and to provide a seal therebetween. If additional assurance is required, a retaining ring and a sealant may be employed.

The annulus 30 is preferably formed in a conventional manner by compression molding a synthetic rubber or polymer compound. Suitable elastomeric compounds include the silicone and nitrile rubbers, and the polyacrylates and fluoroelastomers. Polymers, such as tetrafluroethylene, are also suitable. The annulus 30 is continuously attached along its outer peripheral edge to the radial flange 22, preferably by being bonded thereto during compression molding of the annulus. Other conventional means may be employed to obtain this attachment.

The annulus 30 comprises a radially outwardly extending portion 31 which is attached to the flange 22 as described above. Integral with the outwardly extending portion 31 is an axially extending annular portion 32 which is, as may be noted from the cross-sectional drawings, in effect a cantilever beam. Inward radial loading of the annular portion 32 is obtained by means of a garter spring 35 which is disposed in an annular notch 36 formed in the outer peripheral surface of the annular portion 32. As may be noted from FIG. 1, the notch 36 is adapted to locate a garter spring in line with the air side of the sealing lip 40 of the seal.

The lower or radially inner surface of the annular portion 32 is formed by opposed frustoconical surfaces 38 and 39 which converge to define a sharp sealing lip 40. The sealing lip 40 is dimensioned to provide a slight interference fit with the shaft 14. In assembly, this interference fit causes expansion of the annular portion 32 against the garter spring 35 and also deformation of the sealing lip 40 thereby causing the sharp edge of the lip to become radiused.

As shown in FIG. 2, a plurality of equally spaced hydrodynamic sealing elements 50 are formed on the frustoconical surface 38. As shown in FIG. 5, each of the elements 50 is substantially in the form of a triangular pad. The element 50 has side legs or fluid deflection surfaces 51 and 52 that converge to an apex 53. As will be explained in greater detail, the fluid deflection surfaces 51 and 52 serve to create the hydraulic pressure oil flowing past the sealing lip 40, forcing it back under the lip to the oil side of the seal.

The sealing elements 50 are arranged on the frustoconical surface 38 with their apexes 53 closely adjacent the sealing lip 40. The sealing elements 50 are also arranged normal to the sealing lip 40, i.e. a line drawn equidistant between the side legs 51 and 52 is normal to the sealing lip. As may be noted from the drawings, the included angle between a side leg 51 or 52 and the sealing lip is acute. It has been found that the preferred angle is on the order of 20° thereby making the preferred included angle between a pair of side legs approximately 140°.

Referring particularly to FIG. 5, the surface 55 of the sealing element 50 is made concave. In the preferred embodiment, this concavity, i.e. the surface 55 of the sealing element 50, is defined by a cylindrical surface of revolution 60 as shown by phantom lines on FIG. 5. The surface of revolution 60 has its axis of revolution parallel to a line drawn through the apex and between the side legs 51 and 52. Preferably, this line equally bisects the distance between a pair of side legs. Further, the cylindrical surface of revolution 60 is positioned tangential to the frustoconical surface 38, thereby defining or creating a zone of zero height in the element 50, relative to the frustoconical surface 38. The upper or outer peripheral edges 57 and 58 of the side legs 51 and 52, respectively, are defined by a line drawn across a cylinder 60 at an angle to its axis and accordingly, have an elliptical slope. Furthermore, the side legs or fluid deflection surfaces 51 and 52 are of progressively increasing height relative to the frustoconical surface 38, along their length, in moving from the apex 53 to their outer ends.

Referring to FIG. 4, the radius R of the cylindrical surface of revolution 60 is less than the radius A of curvature of the frustoconical surface 38, thereby imparting relative height to the element 50.

In the operation of the seal of this invention, the sealing lip 40 provides a static and dynamic seal with the shaft 14. The side legs or fluid deflection surfaces 51 and 52 become in effect helically disposed ribs and are in part compressed against the shaft. As described above, the side legs 51 and 52 have progressively increasing height and also progressively increasing mass in moving along their length from the apex to their respective outer ends. FIG. 6 shows the contact pattern or "footprint" 65 made by the seal on the shaft. The line 66 illustrates the contact pattern made by the sealing lip 40. The "V" shaped patterns 67 illustrate the contact pattern of the side legs 51 and 52. As may be noted, the two patterns 66 and 67 are contiguous. This is achieved by positioning the sealing element 50 closely adjacent to the sealing lip 40. By closely adjacent is meant that when the sealing lip 40 is compressed by the shaft 14 the upper edges 57 and 58 are also being compressed, but not to any greater extent so as to lift the lip out of contact with the shaft. As may be noted from FIG. 6, the contact pattern of the side legs progressively decreases until it tapers to no contact. This effect is achieved by coordinating the angle of the frustoconical surface 38 and the radius R of the surface of revolution 60 which defines the surface 55 of the sealing element as well as the contour of the side legs 51 and 52. A preferred approach angle, i.e. the angle between the frustoconical surface 38 and the shaft 14, is on the order of 15°.

Oil seeping past the sealing lip 40 is trapped between the acute angle formed by the side leg 51 or 52 (depending upon the direction of rotation of the shaft 14) and forced back under the sealing lip as a result of the hydraulic pressure created by the deflection surface 51 or 52 and the rotating shaft 14. Because the two deflection surfaces 51 and 52 slope in opposite directions, the operation of the seal 10 is independent of the direction of rotation of the shaft 14 and is therefore completely bidirectional in operation. Because of the minimum contact area and mass of the hydrodynamic sealing element which is created by the above-described concavity, a very light contact pressure results between the sealing element and the shaft, thereby requiring little if any additional radial loading of the seal to maintain the sealing lip in contact with the shaft. Further, it has been found that the minimum contact area pressure does not induce any additional age hardening of the seal.

It will, of course, be understood that various details of construction may be modified through a wide range without departing from the principles of this invention, and it is not, therefore, the intent to limit the patent granted hereon otherwise than necessitated by the scope of the following claims.

What I claim is:

1. In a rotary shaft seal having a radially inwardly directed sealing lip defined by converging frustoconical surfaces, the improvement comprising at least one hydrodynamic sealing element located on one of said frustoconical surfaces, said element being a triangular pad having side legs converging to an apex, said pad arranged with said apex adjacent said sealing lip, the surface of said pad between said side legs being defined by a cylindrical surface of revolution that is tangential to said one frustoconical surface, said cylindrical surface of revolution having its axis parallel to a line bisecting said pad through said apex and a radius that is less than the radius of curvature of said one frustoconical surface, said pads having zero height through their centers and at their apexes which are adjacent to said sealings lip.

2. The rotary shaft seal of claim 1, wherein the included angle between said side legs is approximately 140°.

3. The rotary shaft seal of claim 1, wherein the axis of said surface of revolution is normal to said sealing lip.

4. The rotary shaft seal of claim 1, wherein there are a plurality of sealing elements equally spaced around the circumference of said one frustoconical surface.

5. A rotary shaft seal for sealing between a housing and a relatively rotating shaft comprising an annular rigid case adapted to sealingly engage said housing, a resilient annulus bonded to said annular case, said annulus having a radially inwardly directed, circumferentially extending sealing lip defined by first and second converging surfaces, said sealing lip adapted to sealingly engage said shaft, a plurality of circumferentially spaced hydrodynamic sealing elements formed on said first converging surface, each of said elements having a pair of fluid deflection surfaces converging to an apex, said apex being adjacent said sealing lip, said apex having zero height relative to said first converging surface, and each of said fluid deflection surfaces having progressively increasing height relative to said first converging surface in moving from said apex to their respective outer ends.

6. The rotary shaft seal of claim 5, wherein a zone of zero height relative to said first surface bisects each pair of fluid deflection surfaces and extends through said apex.

7. The rotary shaft seal of claim 6, wherein the surface between a pair of fluid deflection surfaces is defined by a cylindrical surface of revolution that is tangential with said zone of zero height, said surface of revolution having an axis parallel to said zone and a radius that is less than the radius of curvature of said first converging surface.

8. A rotary shaft seal for sealing between a housing and a relatively rotating shaft extending through said housing, comprising a rigid case adapted to sealingly engage said housing, a resilient annulus attached to said case, said annulus having a radially inwardly directed and circumferentially extending sealing lip adapted to sealingly engage said shaft, said sealing lip defined by first and second converging surfaces, a plurality of circumferentially spaced hydrodynamic sealing elements formed on said first converging surface, each of said elements comprising a pair of fluid-deflecting ribs, said ribs of a pair arranged to converge to an apex located adjacent said sealing lip, each of said ribs having zero height relative to said first converging surface at said apex and progressively increasing relative height and mass along their length.

9. The rotary seal of claim 8, wherein said sealing lip forms a continuous, circumferentially extending first zone of contact on said shaft and said ribs are adapted to form second zones of contact contiguous with said first zone, said second zones of contact gradually tapering to zero contact in moving from said first zone of contact.